United States Patent
Keoshkerian et al.

(10) Patent No.: US 6,767,974 B1
(45) Date of Patent: Jul. 27, 2004

(54) PROCESS FORMING PARTICLES WITH FUNCTIONAL GROUPS

(75) Inventors: Barkev Keoshkerian, Thornhill (CA); Thomas E. Enright, Tottenham (CA)

(73) Assignee: Xerox Corporation, Stamford, CT (US)

( * ) Notice: Subject to any disclaimer, the term of this patent is extended or adjusted under 35 U.S.C. 154(b) by 9 days.

(21) Appl. No.: 10/357,540

(22) Filed: Feb. 3, 2003

(51) Int. Cl.[7] .............. C08F 2/00; C08F 2/24; C08F 293/00; C08F 295/00

(52) U.S. Cl. .............. 526/75; 526/73; 526/82; 526/86; 526/87; 526/88

(58) Field of Search .............. 526/73, 75, 82, 526/86, 87, 88

(56) References Cited

U.S. PATENT DOCUMENTS

| | | | |
|---|---|---|---|
| 5,686,518 A | 11/1997 | Fontenot et al. | 524/458 |
| 5,852,140 A | 12/1998 | Georges et al. | 526/82 |
| 6,469,094 B1 * | 10/2002 | Keoshkerian et al. | 524/502 |

OTHER PUBLICATIONS

Jose M. Asua, "Miniemulsion polymerization," *Progress in Polymer Science* 27 (2002), pp. 1283–1346.

Ignac Capek et al., "Radical Polymerization in Direct Miniemulsion Systems," *Advances in Polymer Science* (2001), vol. 155, pp. 101–165.

* cited by examiner

*Primary Examiner*—Kelechi C. Egwim
(74) *Attorney, Agent, or Firm*—Zosan S. Soong

(57) ABSTRACT

A process including:

heating to a first polymerization temperature a first mixture composed of a first free radical polymerizable monomer, a first free radical initiator, and a first stable free radical compound to polymerize only a portion of the first monomer, resulting in a prepolymer composition;

shearing a second mixture including the prepolymer composition, a continuous phase liquid, and a stabilizing compound to create a miniemulsion; and heating to a second polymerization temperature the miniemulsion to form polymeric particles, wherein there is added to the second mixture, the miniemulsion, or both the second mixture and the miniemulsion at any time prior to the formation of the polymeric particles a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface.

19 Claims, No Drawings

PROCESS FORMING PARTICLES WITH FUNCTIONAL GROUPS

BACKGROUND OF THE INVENTION

Keoshkerian et al., U.S. Pat. No. 6,469,094 describes a process for the preparation of polymeric particulate materials employing a free radical polymerizable monomer, a free radical initiator and a stable free radical compound wherein the process includes a first bulk polymerization where controlled initiation and limited or partial monomer polymerization is accomplished for the purpose of preparing a prepolymer mixture followed by a second stage miniemulsion polymerization where substantially complete monomer polymerization is accomplished. There is a need, which the present invention addresses, for new free radical polymerization processes that produce polymer particles with a covalently bound charged group on the particle surface. Such polymer particles with the functional group are advantageous since they are amenable to further manipulation such as aggregation/coalescence in chemical toner processes.

Exemplary polymerization processes are described in the following:

Fontenot et al., U.S. Pat. No. 5,686,518.

Georges et al., U.S. Pat. No. 5,852,140.

Jose M. Asua, "Miniemulsion polymerization," *Progress in Polymer Science* 27 (2002), pp. 1283–1346.

Ignac Capek et al., "Radical Polymerization in Direct Mini-Emulsion Systems," *Advances in Polymer Science* (2001), Vol. 155, pp.101–165.

SUMMARY OF THE INVENTION

The present invention is accomplished in embodiments by providing a process comprising:

heating to a first polymerization temperature a first mixture comprising a first free radical polymerizable monomer, a first free radical initiator, and a first stable free radical compound to polymerize only a portion of the first monomer, resulting in a prepolymer composition;

shearing a second mixture including the prepolymer composition, a continuous phase liquid, and a stabilizing compound to create a miniemulsion; and heating to a second polymerization temperature the miniemulsion to form polymeric particles, wherein there is added to the second mixture, the miniemulsion, or both the second mixture and the miniemulsion at any time prior to the formation of the polymeric particles a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface.

There is also provided in embodiments a process comprising:

heating to a first polymerization temperature a first mixture comprising a first free radical polymerizable monomer, a first free radical initiator, and a first stable free radical compound to polymerize only a portion of the first monomer, resulting in a prepolymer composition, wherein the first mixture prior to heating is free of water;

shearing a second mixture including the prepolymer composition, water, and a stabilizing compound to create a miniemulsion; and heating to a second polymerization temperature the miniemulsion to form polymeric particles, wherein there is added to the second mixture, the miniemulsion, or both the second mixture and the miniemulsion at any time prior to the formation of the polymeric particles a second free radical initiator, a second free radical polymerizable monomer, and an optional second stable free radical compound, wherein the second initiator includes a first functional group and the second monomer includes a second functional group, wherein the polymeric particles each includes a compound with the first functional group and the second functional group which are covalently bound and wherein the first functional group and the second functional group are disposed on the particle surface.

DETAILED DESCRIPTION

In embodiments, the term "miniemulsion" refers to for example an aqueous dispersion of relatively stable hydrophobic droplets of less than about 1.5 micrometer in diameter, particularly less than about 1 micrometer in diameter.

The phrase "functional group" refers to: (1) a "functional charged group" which presently contains a positive or negative charge; and (2) a "functional neutral group" which presently is neutral but can be induced by ionization to result in a positive or negative charge. Ionization can be induced by for example heating, electrical potential, changing pH, and the like. For example, a carboxylic acid as the functional neutral group can be taken to a basic pH to generate the carboxylate functional charged group. The functional neutral group can be, but is not limited to, for example carboxylic acids, sulphonic acids, phosphates, amines and the like. The functional charged group can be for example carboxylates, sulfonates, phosphates, quaternary amines, and the like. The substituents on the functional group can be aromatic, aliphatic or combinations thereof.

The density or amount of functional groups on the polymeric particle surface may be of any appropriate values and may be determined by any suitable technique and device such as by using a zeta potentiometer.

The present invention may be used to process and prepare a variety of polymeric materials, including toner particles for use in liquid and dry developer marking applications in a cost efficient manner. An advantage of the present invention is that the processes thereof in embodiments may afford control over the particle size, particle size distribution properties of the resulting fine particulate products, and precise control over the molecular weight and molecular weight distribution properties of the resulting polymer products. Additionally, the present invention provides in embodiments superior latex formation processes with substantially quantitative conversion, or yield, of polymer product and with unexpectedly low residual monomer. In embodiments, the functional group allows for the stability of the particles and also manipulation of the particle size by reducing the charge (by example through pH) and allowing for aggregation.

In an embodiment, the present invention relates to a stable free radical moderated miniemulsion polymerization process for producing a polymer resin or resins, that have narrow polydispersities, that is, narrow molecular weight distributions as defined by the ratio Mw:Mn, where Mw is weight average molecular weight of the polymer and Mn is number average molecular weight of the polymer, with an easily controlled modality.

The present invention involves heating the first mixture composed of at least one free radical polymerizable monomer, a first free radical initiator, and a stable free radical compound to polymerize only a portion of the monomer, resulting in a prepolymer composition.

The heating of the first mixture can be at a polymerization temperature ranging for example from about 110 to about 145 degrees C. for a time ranging for example from about 5 minutes to about 4 hours, particularly from about 20 minutes to about 1 hour. The heating conditions can vary depending on, for example, the scale of the reaction and the results desired.

The prepolymer composition includes unreacted monomer and molecules of polymerized monomer. In embodiments, no unreacted free radical initiator may be present but the prepolymer composition may include small amounts of the stable free radical compound. Heating of the first mixture polymerizes less than all of the monomer or monomers; in embodiments, heating of the first mixture is ended when only a portion of the monomer or monomers is polymerized such as for example from about 1 to about 50% by weight, particularly from about 10 to about 25% by weight, of the monomer or monomers. There may be any suitable percentage of conversion of the monomer(s) to the polymer as long as the viscosity of the prepolymer composition is not too high for shearing.

The amounts of the various components of the first mixture (prior to heating) are now described with illustrative concentrations.

The molar ratio of the stable free radical compound (SFR) to radicals from the first free radical initiator (INIT1) is for example from about 0.8(SFR):1.2(INIT1) to about 1(SFR):1(INIT1). Since one mole of the free radical initiator (whether first free radical initiator or second free radical initiator), depending on the specific initiator, can theoretically result in one, two, three or more moles of radicals, the molar ratio of the free radical initiator (whether first free radical initiator or second free radical initiator) is based on the theoretical maximum number of moles of radicals resulting from the free radical initiator.

In embodiments, in the first mixture, the molar ratio of free radical polymerizable monomer (total of all types) to stable free radical compound (total of all types) to radicals from the free radical initiator (total of all types) is for instance from about 50:2:1 to about 10,000:2.5:1 and particularly in the range of about 300:1.3:1 to about 7,000:1.8:1.

In the first mixture, each ingredient (e.g., monomer, initiator, and stable free radical compound) may be of only one type or may be composed of two or more types. Where the ingredient is composed of two or more types, each ingredient type may be present at any suitable molar ratio such as at a molar ratio ranging for example from about 99(first type of one ingredient):1(second type of the same ingredient) to about 1(first type of one ingredient):99(second type of the same ingredient).

A continuous phase liquid may be present or absent in the first mixture prior to heating. The phrase "continuous phase liquid" refers to any liquid that allows a different phase composed of droplets or particles to be present within the liquid. In embodiments, any continuous phase liquid present in the first mixture may be boiled off at the temperature employed in the heating. The continuous phase liquid may be for example water, an organic liquid such as toluene, acetone, and tetrahydrofuran, and the like.

In embodiments, the ingredients of the first mixture and the heating conditions for the first mixture are selected in order to perform a bulk polymerization or solution polymerization of the first monomer to low conversion, where the conversion rate is described herein.

A second mixture is subjected to shearing to create a miniemulsion, wherein the second mixture is composed of at least the prepolymer composition, a continuous phase liquid, and a stabilizing compound. There is added to the second mixture, the miniemulsion, or both the second mixture and the miniemulsion at any time prior to the formation of the polymeric particles a number of additional ingredients (referred as "Additional Ingredients") such as for instance a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface. In embodiments, all of the Additional Ingredients can be added to the second mixture prior to the shearing. In other embodiments, all of the Additional Ingredients are added to the miniemulsion. In still other embodiments, one or more of the Additional Ingredients is added to the second mixture, while the rest of the Additional Ingredients is added to the miniemulsion. In further embodiments, a portion of a single Additional Ingredient may be added to the second mixture while the remaining amount of that single Additional Ingredient is added to the miniemulsion. All manners of adding the Additional Ingredients are encompassed within the present invention.

The shearing can be accomplished by a variety of high shear mixing devices, for example, a piston homogenization, a microfluidizer, a polytron, an ultrasonicator, and the like devices. In embodiments, the miniemulsion may be formed for instance in a piston homogenizer at for example from about 1 to about 60 minutes at a pressure for instance of about 1,000 to about 30,000 psi. The miniemulsion prior to its heating is composed of droplets of the prepolymer composition with a volume average diameter, for example, of from about 25 nanometers to about 1 micrometer, particularly from about 100 to about 400 nanometers.

Illustrative molar percentages of the ingredients in the second mixture/miniemulsion are as follows:

(1) The second free radical polymerizable monomer is present in an amount for example from about 1% to about 25% molar relative to the first monomer (based on 100 moles of the first monomer), and particularly from about 5% to about 10% molar relative to the first monomer.

(2) The second free radical initiator may be present in an amount for example from about 0.1% to about 0.01% molar relative to the second monomer (based on 100 moles of the second monomer).

(3) The optional second stable free radical compound may be present for example at a molar ratio to radicals from the second initiator of from about 0.8 to about 1.2.

(4) The stabilizing compound may be present for example in the range of about 0.2% to about 5% (weight/weight to the continuous phase liquid).

(5) The continuous phase liquid may be present for example in the range of about 50% to about 90% by weight relative to all the hydrophobic ingredients in the second mixture (e.g., polymerized monomers, unreacted monomers and any waxes).

In the second mixture/miniemulsion, each ingredient (e.g., prepolymer composition, continuous phase liquid, stabilizing compound, monomer, stable free radical compound, and initiator) may be of only one type or may be composed of two or more types. Where the ingredient is composed of two or more types, each ingredient. type may be present at any suitable molar ratio such as at a molar ratio ranging for example from about 99(first type of one ingredient):1(second type of the same ingredient) to about 1)first type of one ingredient):99(second type of the same ingredient).

The miniemulsion is heated to result in polymeric particles each including a compound with the functional group wherein the functional group is covalently bound and is disposed on the particle surface.

The heating of the second mixture can be at a polymerization temperature ranging for example from about 110 to about 145 degrees C. for a time ranging for example from about 2 hours to about 8 hours, particularly from about 4 hours to about 6 hours. The heating conditions can vary depending on, for example, the scale of the reaction and the results desired.

The present process, in embodiments, provide for high monomer to polymer conversion levels, or degrees of polymerization, for example, of about 90 percent by weight or greater, or from about 95 to 100 percent, and particularly from about 98 to about 100 percent (the conversion percentages refer to all monomers employed in the present process). After heating of the miniemulsion to the second polymerization temperature to form the polymeric particles, the resulting composition containing the polymeric particles is considered a latex or emulsion.

There may be a single compound with the functional group in the polymeric particles or a mixture of two or more different compounds with the same or different functional group in the polymeric particles. In embodiments, there can be a single compound with two or more different functional groups, where such compounds are typically called zwitterions and contain for instance a carboxylic acid and an amine. For example, amino acids are zwitterions because upon ionization the hydrogen from the carboxylic acid goes on the nitrogen and the molecule now contains both a positive and negative charge. The compounds with the functional groups may be oligomeric compounds or polymeric compounds with monomer units ranging in number for example from 1 to about 30,000, or from about 50 to about 200.

In a first type, the compound with the functional group is of the formula I-R-SFR, wherein R is an oligomer/polymer polymerized from the first monomer and second monomer, I is a covalently bound free radical initiator fragment with a covalently bound functional group arising from the second free radical initiator having the functional group, and SFR is a covalently bound stable free radical group. A compound with the functional group of the formula I-R-SFR can be for example:

I-(styrene/butylacrylate)$_x$-SFR where x is an integer from 1 to about 1,000.

In a second type, the compound with the functional group is of the formula I'-R'-SFR, wherein R' is an oligomer/polymer with a covalently bound functional group polymerized from the first monomer and from the second monomer which includes the functional group, I' is a covalently bound free radical initiator fragment arising from the first free radical initiator, and SFR is a covalently bound stable free radical group. A compound with the functional group of the formula I'-R'-SFR can be for example:

I'-(styrene/acrylicacid)$_{x\text{-}SFR}$ where x is an integer from 1 to about 1,000.

In a third type, the compound includes two different functional groups and is of the formula I"-R"-SFR, wherein R" is an oligomer/polymer with a covalently bound first functional group polymerized from the first monomer and from the second monomer which includes the first functional group, I" is a covalently bound free radical initiator fragment with a covalently bound second functional group arising from the second free radical initiator having the second functional group, and SFR is a covalently bound stable free radical group. A compound with the functional group of the formula I"-R"-SFR can be for example:

I"-(styrene/styrenesulfonate/acrylicacid)$_x$-SFR where x is an integer from 1 to about 1,000.

In embodiments, the present process can further include separating the polymeric particles (which may be solid) from the liquid phase, where such separation can be accomplished by conventional methods, such as, filtration, sedimentation, spray drying, and the like known methods.

The characteristics of the compounds with the functional group are now discussed. The weight average molecular weight (Mw) of the compounds with the functional group can be, for example, from about 3,000 to about 200,000, and particularly about 10,000 to about 150,000. The compounds with the functional group can have a narrow polydispersity, for example, of from about 1.1 to about 3.0, from about 1.1 to about 2.0, or from about 1.05 to about 1.45. The polymeric particles have a volume average diameter, for example, of from about 25 nanometers to about 1 micrometer, particularly from about 100 to about 600 nanometers.

With regards to monomers useful in the present invention which do not include a functional group, any suitable free radical polymerizable monomers may be employed in the present process including for example unsaturated monomers, such as styrene compounds, conjugated compounds, acrylates compounds, 9-vinyl carbazole compounds, vinyl chloride compounds, and vinyl acetate compounds. More specifically the monomer can be styrene, alkyl substituted styrenes with from 1 to about 20 carbon atoms, butadiene, and alkyl methacrylate. The first monomer can be the same or different from the second monomer.

With regards to monomers useful in the present invention which include a functional group, they can be acrylic acid and its derivatives of the formula (CH$_2$=CH)COOR—COOH (where the R group can be a spacer aliphatic group to for example impart different hydrophilicity); maleic acid and its derivatives of the formula R,R'-maleicacid (where the R,R' group can be aliphatic or aromatic, as for example phthalic anhydride); styrenic monomers (such as styrenesulfonic acids, 4-vinylbenzoic acids); and methacrylic acid and its derivatives of the formula (CH$_2$=CCH$_3$)COORCOOH (where the R group can be a spacer aliphatic group to for example impart different hydrophilicity), and the like.

With regards to initiators useful in the present invention which do not include a functional group (where such initiators in embodiments may be soluble in the continuous phase liquid), any suitable free radical initiator may be employed such as peroxide compounds and diazo compounds like for example benzoyl peroxide, di-tbutylperoxide, 4,4'-azobisvaleronitrile, and 4,4'-azobis(cyanohexane). The first initiator can be the same or different from the second initiator.

In embodiments, the first initiator, the first monomer, or both the first initiator and the first monomer includes a functional group which may be the same or different from each other, and may be the same or different from the functional group of the second initiator or the functional group of the second monomer.

With regards to initiators useful in the present invention which include a functional group (where such initiators in embodiments may be soluble in the continuous phase liquid), any suitable free radical initiator may be employed such as hydrogen peroxide, t-butyl hydroperoxide, 2,2'-azobis(2-amidinopropane)dihydrochloride, 2,2'-azobis(2-methylpropionamidine)dihydrochloride, 4,4' azobis(4-cyanovaleric acid), 4,4'-azobis(4-cyanopentanoic acid), potassium persulfates and aminopersulfates.

The covalently bound stable free radical end group SFR can be obtained from a stable free radical compound such as 2,2,5,5-tetramethyl-1-pyrrolidinyloxy compounds, 2,2,6,6-tetramethyl-1-piperidinyloxy compounds, 4,4-dimethyl-3-oxazolinyloxy compounds, and di-tertiary alkyl substituted nitroxide compounds. SFR end groups and stable free radical compounds are disclosed in for example U.S. Pat. No. 5,530,079, the disclosure of which is totally incorporated herein by reference. The first stable free radical compound can be the same or different from the second stable free radical compound.

The phrase "stable free radical compound" encompasses: (1) the stable free radical compound by itself; and (2) an adduct of the stable free radical compound composed of for example stable free radical compound-monomer unit-initiator fragment, where the stable free radical compound is covalently bound to the monomer unit and the initiator fragment is covalently bound to the monomer unit, or where the adduct is the stable free radical compound covalently bound to the monomer unit. One example of an adduct is benzoicacid-2-phenyl-2-(2,2,6,6-tetrametbylpiperidin-1-yloxy)-ethylester, formed from benzoyl peroxide, styrene and 2,2,6,6-tetramethylpiperidin-1-yloxy free radical (also referred herein as "TEMPO").

The stabilizing compound can be for example a surfactant including anionic, cationic, amphoteric, and nonionic surfactants customarily used in emulsion polymerization. In embodiments, the surfactant is selected from ionic surfactants, which class of surfactants may be generally better suited to the higher temperatures associated with the present processes. Representative types of anionic surfactants are the alkylaryl sulfonates, alkali metal alkyl sulfates, the sulfonated alkyl esters, the fatty acid soaps, and the like, such as sodium alpha-olefin ($C_{14}$–$C_{16}$) sulfonates. Exemplary surfactants are alkali metal alkylaryl sulfonates. In embodiments, there are used anionic surfactants, such as alkyl sulfonate salts or arylalkyl sulfonate salts, for example, dodecylbenzenesulfonic acid sodium salt ("SDBS"). The surfactant can be employed in varying amounts providing that a satisfactory miniemulsion is achieved by, for example, exceeding the critical micelle concentration (CMC). The stabilizing compound can be present for example in an amount of from about 1 to about 5 weight percent, or from about 2 to about 5 weight percent, and especially from about 2 to about 3 weight percent, based on the weight of the continuous phase liquid. A listing of suitable stabilizing compounds such as surfactants which may be useful in the inventive process is found in the book "McCutcheon's Emulsifiers and Detergents 1981 Annuals", which is incorporated by reference herein in its entirety.

One or more cosurfactants can be optionally added to further minimize diffusion due to Oswald ripening. The cosurfactant may be compounds that have a low water solubility, or are substantially insoluble, such as long chain hydrocarbons with from about 10 to about 40 carbon atoms, and particularly from about 15 to about 25 carbon atoms, alcohols, mercaptans, carboxylic acids, ketones, amines, or any other long chain molecules, with or without functional groups that do not substantially interfere with the stable free radical or miniemulsion chemistry, for example, dodecyl mercaptan, hexadecane, cetyl alcohol, and the like, and mixtures thereof, wherein the cosurfactant is in a mole ratio of, for example, from about 0.004 to about 0.08, and preferably from about 0.005 to about 0.05 with respect to the monomer, a mole ratio of from about 0.1 to about a 10, and particularly from about 0.5 to about 5.0 with respect to the surfactant. In embodiments, the cosurfactant can be a linear or branched hydrocarbon with from about 5 to about 40 carbon atoms, a linear or branched aliphatic alcohol with from about 5 to about 40 carbon atoms, wherein the cosurfactant is in a mole ratio of from about 0.01 to about 0.04 with respect to the monomer, a mole ratio of from about 0.5 to about 6.0 with respect to the surfactant, and wherein the cosurfactant prevents, or minimizes coalescence of the miniemulsion droplets. In embodiments, the cosurfactant is in a mole ratio of from about 0.012 to about 0.025 with respect to the monomer.

The concentration of the cosurfactant mentioned above and the concentration of the activator mentioned below are relative to the "monomer." In embodiments, the "monomer" refers to the amount of the monomer or monomers present in the first mixture.

Alternatively in embodiments in place of a cosurfactant, high polymer, one or more activator compounds, can be added in minor amounts to enhance droplet nucleation as well as minimize Oswald ripening. Activators are typically used in amounts of from about 0.01 to about 2 weight percent based on monomer. The molecular weight of the activator, in embodiments, can range from about 1,000 to about 200,000, and particularly from about 3,000 to about 15,000.

The miniemulsion can further include a buffer such as alkali metal carbonates, alkaline earth carbonates, alkali metal bicarbonates, acetates, borates, and the like buffers, and mixtures thereof. In embodiments, the buffer may be added before the formation of the miniemulsion.

The polymeric particles of the present invention may be optionally crosslinked with, for example, known crosslinking or curing agents such as divinyl benzene and the like, either in situ or in a separate post polymerization process procedure. Additional optional known additives may be used in the polymerization reactions which do not interfere with the present process and which may provide additional performance enhancements to the resulting product, for example, colorants, lubricants, release or transfer agents, antifoams, antioxidants, and the like.

In embodiments, there can be incorporated into the first mixture, the second mixture, or the miniemulsion, or at any stage of the present process, a waxy component, such as alkylenes, like polyethylene, polypropylene waxes, and mixtures thereof having a low molecular weight of from between about 1,000 to about 20,000 in amounts of from about 0.1 to about 15 weight percent of the total monomer polymerized. Alternatively, the waxy component may be added to the isolated polymeric product of the process. The use of such a component may be desirable for certain toner applications. Suitable low molecular weight waxes are disclosed in U.S. Pat. No. 4,659,641, the disclosure of which is totally incorporated herein by reference.

Toner compositions can be prepared by a number of known methods, such as admixing and heating resin, or polymer particles obtained with the processes of the present invention such as water soluble or insoluble styrene butadiene copolymers, colorants, such as pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter. Alternatively, the toner compositions are ground with a fluid bed grinder equipped with a classifier wheel constructed in accordance with the present invention, and then classified using a classifier equipped with a classifier wheel constructed in accordance with the present invention. In embodiments, a toner can be prepared directly, thereby foregoing the extensive particle sizing and separation process by including, for example, a suitable colorant in the miniemulsion droplets prior to polymerization, and thereafter isolating the resulting colored toner particles. In embodiments, the presence of functional groups on the surface of the polymeric particles is advantageous for chemical toner fabrication. The surface charges allow for aggregants to react with them and thus result in latex aggregation from nanometer sized particles to micrometer sized chemical toner.

Illustrative examples of resins suitable for toner and developer compositions include branched styrene acrylates, styrene methacrylates, styrene butadienes, vinyl resins, including branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge-enhancing additive is present, and 10 percent by weight of pigment or colorant, such as carbon black, is contained therein, about 89 percent by weight of resin is selected. Also, the charge-enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be themselves surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SEGLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methyl methacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions may have toner particles with an average diameter of for example from about 5 to about 25 microns, from about 8 to about 12 microns, or from about 5 to about 8 microns. Also, the toner compositions may possess a triboelectric charge of for example from about 0.1 to about 2 femtocoulombs per micron as determined by the known charge spectrograph. Admix time for toners are for example from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared, in embodiments, of the present invention possess desirable narrow charge distributions, optimal charging triboelectric values, such as for example of from 10 to about 40, or from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of for example less than 15 seconds, or in some embodiments from about 1 to about 14 seconds.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLE 1

Preparation of Low Conversion Bulk Pre-Polymer Lab Scale

In a 3-necked round-bottomed flask was added styrene (465 ml), n-butyl acrylate (135 ml), 2,2,6,6-tetramethyl-4-hydroxy-piperidin-1-yloxy (referred herein as "HOTEMPO")(7.82 g, 0.0454 mol) and vazo 88 (5.84 g, 0.0239 mol). This was then deoxygenated by flushing argon gas through the solution for 20 minutes at room temperature and then heated to 135 C (oil bath temperature) for 2 hours to yield a poly(styrene-co-n-butylacrylate) with Mn=2347 and P.D. of 1.22.

EXAMPLE 2

Preparation of Latex with Chaged Surface

An aqueous solution was prepared that contained dodecylbenzenesulfonic acid sodium salt ("SDBS") (6 g), $Na_2S_2O_7$ (1.42 g, 0.0059 mol), HOTEMPO (1.85 g, 0.0107 mol), acrylic acid (9 ml) and de-ionized water (1.2 L). To this was added 300 mL of the pre-polymer (prepared according to Example 1) and stirred for about 5 minutes. The mixture was then piston homogenized for one pass at about 700 BAR. The mini-emulsion was transferred to the 2 L PARR reactor and then deoxygenated by 10 pressurization/depressurization cycles with argon. The mini-emulsion was then heated to 135° C. After 1 hour at temperature, 8 ml of ascorbic acid (0.189 g/ml) was continuously added at a rate of 0.033 ml per minute over a 4-hour period. After a total of 6 hours at temperature the reaction was cooled to yield a poly(styrene/butyl acrylate) latex of Mn=13,000, Tg of ~50C with a PD of 1.46 and particle size of ~190 nm.

EXAMPLE 3

Bulk Prepolymer Preparation (2-L Scale)

1062 g styrene (Rohm and Haas) and 303.3 g n-butyl acrylate (Rohm and Haas) were charged into a 2-L stainless steel Buchi reactor. Mixing was started at a rate of 500 RPM using a 2 inch diameter stainless steel pitch-blade impeller, and this was maintained throughout the reaction. 17.8 g TEMPO (Z.D. Chemipan) was added to the mixture and stirred for 5 minutes to dissolve. 14.7 g 1,1'-azobis (cyanocyclohexane) initiator (Vazo-88; Dupont Chemicals) was added to the mixture and stirred for 5 minutes to dissolve. Nitrogen was bubbled through the mixture at a rate of 5 standard cubic feet per hour ("SCFH") throughout the reaction. The reactor was heated up to 135° C., and this temperature was maintained for 90 minutes. The reactor was then cooled to room temperature and reactor contents were discharged into a stainless steel beaker. The solution contained 20.1 wt % polymer solids as measured gravimetrically. The polymer solids had the following molecular weight characteristics as measured by gel permeation chromatography: Mn=2175, Mw-2592, Polydispersity=1.19. This product is hereafter refered to as 'bulk prepolymer'.

EXAMPLE 4

Latex Preparation (2-L Scale)

1262 g deionized water was charged into a 2-L stainless steel beaker, and mixing was started at a rate of 500 RPM using a 2-inch diameter stainless steel pitch-blade impeller. 19 g dodecylbenzenesulfonic acid sodium salt ("SDBS"; Aldrich) and 1.5 g sodium persulfate (Aldrich) were added to the water and mixed for 5 minutes to dissolve. 286.6 g 'bulk prepolymer' (prepared according to Example 3), 20 g acrylic acid (Aldrich), and 2.0 g TEMPO (Z.D. Chemipan) were added to the mixture and stirred for 5 minutes. The mixture was then passed through a Niro-Soavi piston homogenizer that was set at a pressure between 400 BAR to 600 BAR. The mixture was then charged into a 2-L stainless steel Buchi reactor equipped with a 2-inch stainless steel pitch-blade impeller. Agitation was started at 500 RPM, and this was maintained throughout the reaction. The reactor was sealed and heated up to 135° C., and this temperature was maintained for 5.5 hours. After 30 minutes at 135° C., a mixture of 1.5 g ascorbic acid and 119 g deionized water was fed into the reactor at a rate of 0.5 grams per minute using a piston pump. After 5.5 hours at 135° C., the reactor was cooled to room temperature and reactor contents were discharged into a 2-L stainless steel beaker. The final latex contained 18.0wt % polymer solids as measured gravimetrically. Volume average particle size was 156nm as measured by a NICOMP light scattering device. 233 ppm residual styrene and 197 ppm residual n-butyl acrylate were measured by gas chromatography. The polymer product had the following molecular weight characteristics as measured by gel permeation chromatography: Mn=11074, Mw=14297, Polydispersity=1.29. Onset glass transition temperature of the polymer was 51.6° C. as measured by differential scanning calorimetry.

Other modifications of the present invention may occur to those skilled in the art based upon a reading of the present disclosure and these modifications are intended to be included within the scope of the present invention.

We claim:

1. A process comprising:
    heating to a first polymerization temperature a first mixture comprising a first free radical polymerizable monomer, a first free radical initiator, and a first stable free radical compound to polymerize only a portion of the first monomer, resulting in a prepolymer composition;
    shearing a second mixture including the prepolymer composition, a continuous phase liquid, and a stabilizing compound to create a miniemulsion; and
    heating to a second polymerization temperature the miniemulsion to form polymeric particles, wherein there is added to the second mixture, the miniemulsion, or both the second mixture and the miniemulsion at any time prior to the formation of the polymeric particles a second free radical initiator, a second free radical polymerizable monomer, and an optional second stable free radical compound, wherein at least one of the second initiator and the second monomer includes a functional group, wherein the polymeric particles each includes a compound with the functional group covalently bound and with the functional group disposed on the particle surface.

2. The process of claim 1, wherein the first polymerization temperature ranges from about 110 to about 145 degrees C. and the second polymerization temperature ranges from about 110 to about 145 degrees C.

3. The process of claim 1, wherein the first stable free radical compound and the second stable free radical compound are the same.

4. The process of claim 1, wherein the second initiator includes the functional group.

5. The process of claim 1, wherein the second monomer includes the functional group.

6. The process of claim 1, wherein the second initiator includes the functional group and the second monomer includes the same or different functional group.

7. The process of claim 1, wherein the first mixture further includes a co-monomer.

8. The process of claim 1, wherein the heating the first mixture is ended when about 1 to about 50% of the first monomer is polymerized.

9. The process of claim 1, wherein the compound with the functional group exhibits a molecular weight polydispersity of from about 1.1 to about 3.0.

10. The process of claim 1, wherein the continuous phase liquid is water.

11. The process of claim 1, wherein the polymeric particles have a volume average diameter of from about 25 nanometers to about 1 micrometer.

12. A process comprising:

heating to a first polymerization temperature a first mixture comprising a first free radical polymerizable monomer, a first free radical initiator, and a first stable free radical compound to polymerize only a portion of the first monomer, resulting in a prepolymer composition, wherein the first mixture prior to heating is free of water;

shearing a second mixture including the prepolymer composition, water, and a stabilizing compound to create a miniemulsion; and heating to a second polymerization temperature the miniemulsion to form polymeric particles, wherein there is added to the second mixture, the miniemulsion, or both the second mixture and the miniemulsion at any time prior to the formation of the polymeric particles a second free radical initiator, a second free radical polymerizable monomer, and an optional second stable free radical compound, wherein the second initiator includes a first functional group and the second monomer includes a second functional group, wherein the polymeric particles each includes a compound with the first functional group and the second functional group which are covalently bound and wherein the first functional group and the second functional group are disposed on the particle surface.

13. The process of claim 12, wherein the first polymerization temperature ranges from about 110 to about 145 degrees C. and the second polymerization temperature ranges from about 110 to about 145 degrees C.

14. The process of claim 12, wherein the first stable free radical compound and the second stable free radical compound are the same.

15. The process of claim 12, wherein the first functional group and the second functional group are the same.

16. The process of claim 12, wherein the first mixture further includes a co-monomer.

17. The process of claim 12, wherein the heating the first mixture is ended when about 1 to about 50% of the first monomer is polymerized.

18. The process of claim 12, wherein the compound with the first functional group and the second functional group exhibits a molecular weight polydispersity of from about 1.1 to about 3.0.

19. The process of claim 12, wherein the polymeric particles have a volume average diameter of from about 25 nanometers to about 1 micrometer.

* * * * *